(12) United States Patent
Huang

(10) Patent No.: US 10,931,355 B2
(45) Date of Patent: Feb. 23, 2021

(54) METHOD AND APPARATUS FOR QCL ASSOCIATION INDICATION FOR DISCONTINUOUS TRANSMISSION INDICATION IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 63 days.

(21) Appl. No.: 16/248,293

(22) Filed: Jan. 15, 2019

(65) Prior Publication Data

US 2019/0222284 A1 Jul. 18, 2019

Related U.S. Application Data

(60) Provisional application No. 62/617,735, filed on Jan. 16, 2018.

(51) Int. Cl.
| | | |
|---|---|---|
| *H04W 56/00* | (2009.01) | |
| *H04B 7/06* | (2006.01) | |
| *H04W 72/04* | (2009.01) | |
| *H04L 5/00* | (2006.01) | |
| *H04B 7/08* | (2006.01) | |

(52) U.S. Cl.
CPC ......... *H04B 7/0626* (2013.01); *H04L 5/0048* (2013.01); *H04L 5/0051* (2013.01); *H04L 5/0053* (2013.01); *H04W 72/042* (2013.01); *H04B 7/0695* (2013.01); *H04B 7/088* (2013.01); *H04L 5/0023* (2013.01)

(58) Field of Classification Search
CPC .... H04B 7/0626; H04B 7/0695; H04B 7/088; H04L 5/0048; H04L 5/0053; H04L 5/0051

USPC .......................................................... 370/329
See application file for complete search history.

(56) References Cited

U.S. PATENT DOCUMENTS

| | | | | |
|---|---|---|---|---|
| 10,651,995 | B2 * | 5/2020 | Nam | H04L 5/0053 |
| 2012/0106493 | A1 * | 5/2012 | Noh | H04L 5/0007 370/329 |
| 2018/0191470 | A1 * | 7/2018 | Manolakos | H04L 1/1861 |
| 2018/0219667 | A1 | 8/2018 | Zhao | |
| 2019/0166625 | A1 * | 5/2019 | Nam | H04L 5/0048 |
| 2020/0008216 | A1 * | 1/2020 | Iyer | H04W 72/1242 |

FOREIGN PATENT DOCUMENTS

| | | |
|---|---|---|
| WO | 2016118329 | 7/2016 |
| WO | 2018129319 | 7/2018 |

* cited by examiner

*Primary Examiner* — Sai Ming Chan
(74) *Attorney, Agent, or Firm* — Blue Capital Law Firm, P.C.

(57) ABSTRACT

Methods and apparatuses for QCL association indication for discontinuous transmission indication are disclosed herein. In one method, the UE receives a first configuration of a plurality of reference signals or a configuration of a plurality of reference signal sets in a cell, wherein a reference signal serves as a quasi-co-location reference. The UE receives a second configuration of an association between a pre-emption indication (PI) and one reference signal from the plurality of reference signals or one reference signal set from the plurality of reference signal sets. The UE receives data based on a reference signal from a first reference signal set. The UE processes data according to the PI for the first reference signal set and not processing the data according to the PI for a second reference signal set.

17 Claims, 9 Drawing Sheets

METHOD AND APPARATUS FOR QCL ASSOCIATION INDICATION FOR DISCONTINUOUS TRANSMISSION INDICATION IN A WIRELESS COMMUNICATION SYSTEM

CROSS-REFERENCE TO RELATED APPLICATIONS

The present application claims the benefit of U.S. Provisional Patent Application Ser. No. 62/617,735 filed on Jan. 16, 2018, the entire disclosure of which is incorporated herein in its entirety by reference.

FIELD

This disclosure generally relates to wireless communication networks, and more particularly, to a method and apparatus for QCL association indication for discontinuous transmission indication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for QCL association indication for discontinuous transmission indication in a wireless communication system are disclosed herein. In one method, the UE receives a first configuration of a plurality of reference signals or a configuration of a plurality of reference signal sets in a cell, wherein a reference signal serves as a quasi-co-location reference. The UE receives a second configuration of an association between a pre-emption indication (PI) and one reference signal from the plurality of reference signals or one reference signal set from the plurality of reference signal sets. The UE receives data based on a reference signal from a first reference signal set. The UE processes data according to the PI for the first reference signal set and not processing the data according to the PI for a second reference signal set.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: Final Report of 3GPP TSG RAN WG1#AH_NR2 v1.0.0 (Qingdao, China, 27-30 Jun. 2017); Final Chairman's Note of 3GPP TSG RAN WG1 Meeting #90 (Prague, Czech Republic, 21-25 Aug. 2017); Final Chairman's Note of 3GPP TSG RAN WG1 Meeting #AH_NR3 (Nagoya, Japan, 18-21 Sep. 2017); Final Chairman's Note of 3GPP TSG RAN WG1 Meeting #90bis (Prague, CZ, 9-13 Oct. 2017); Final Chairman's Note of 3GPP TSG RAN WG1 Meeting #91 (Reno, USA, 27 Nov.-1 Dec. 2017); R1-1721342, "NR; Multiplexing and channel coding (Release 15)"; R1-1721343, "NR; Physical layer procedures for control (Release 15)"; and R1-1721344, "NR; Physical layer procedures for data (Release 15)." The standards and documents listed above are hereby expressly incorporated by reference in their entirety.

Figure 1:
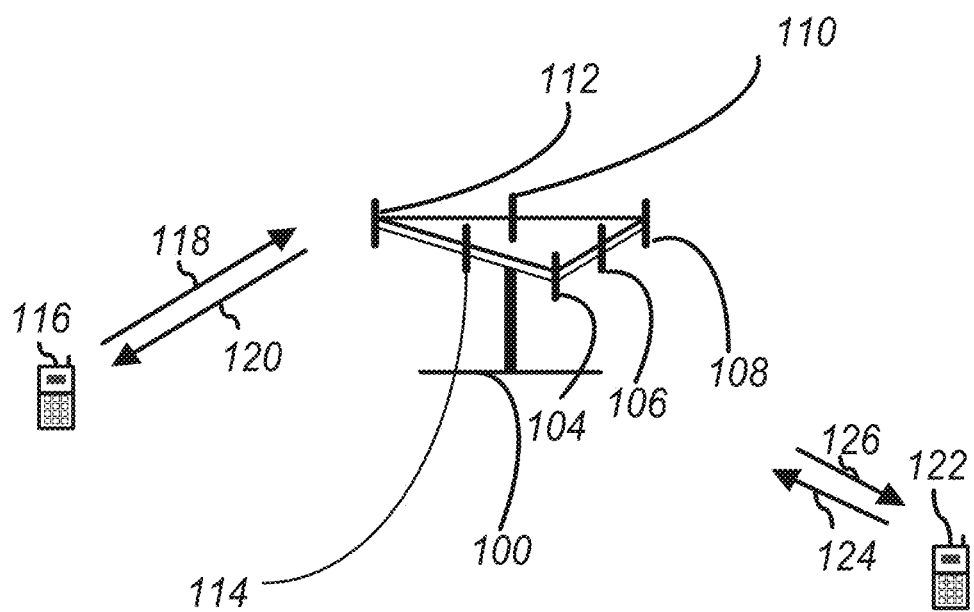
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
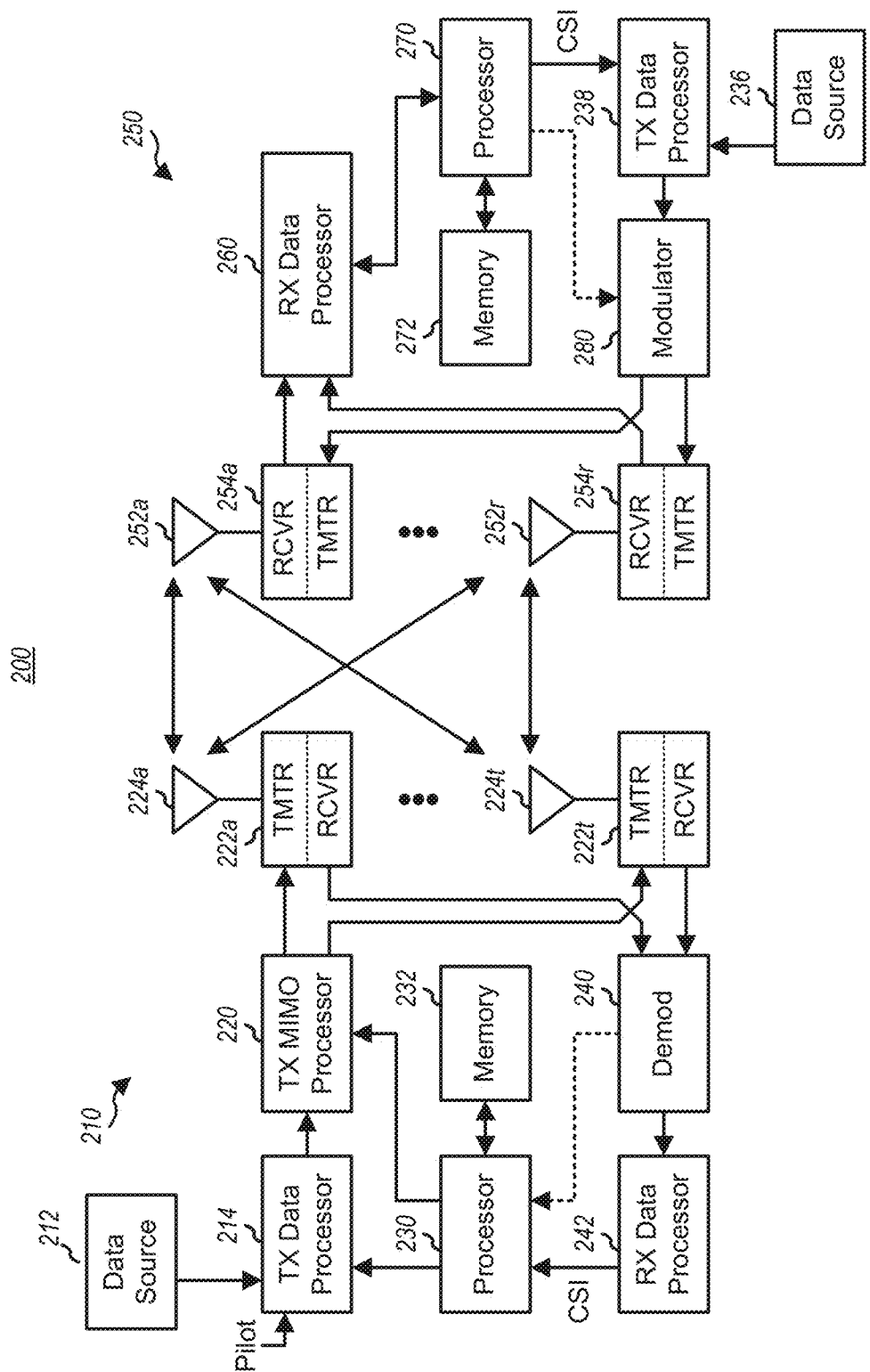
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
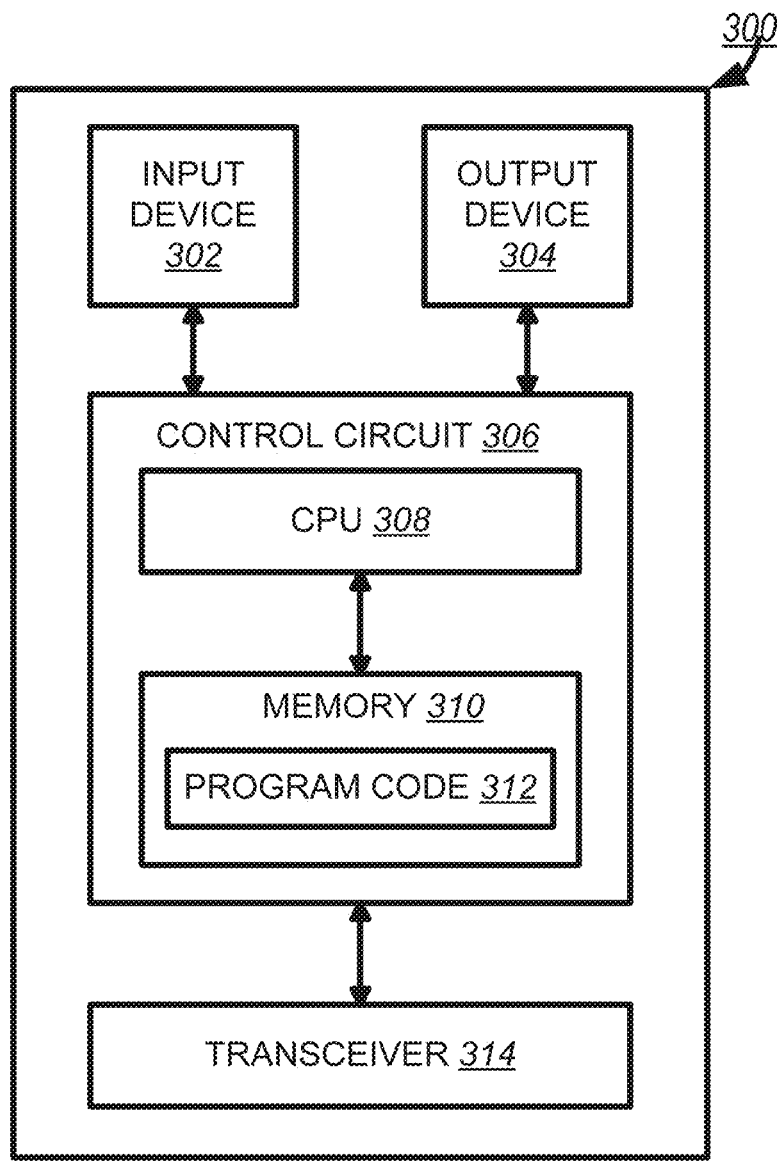
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
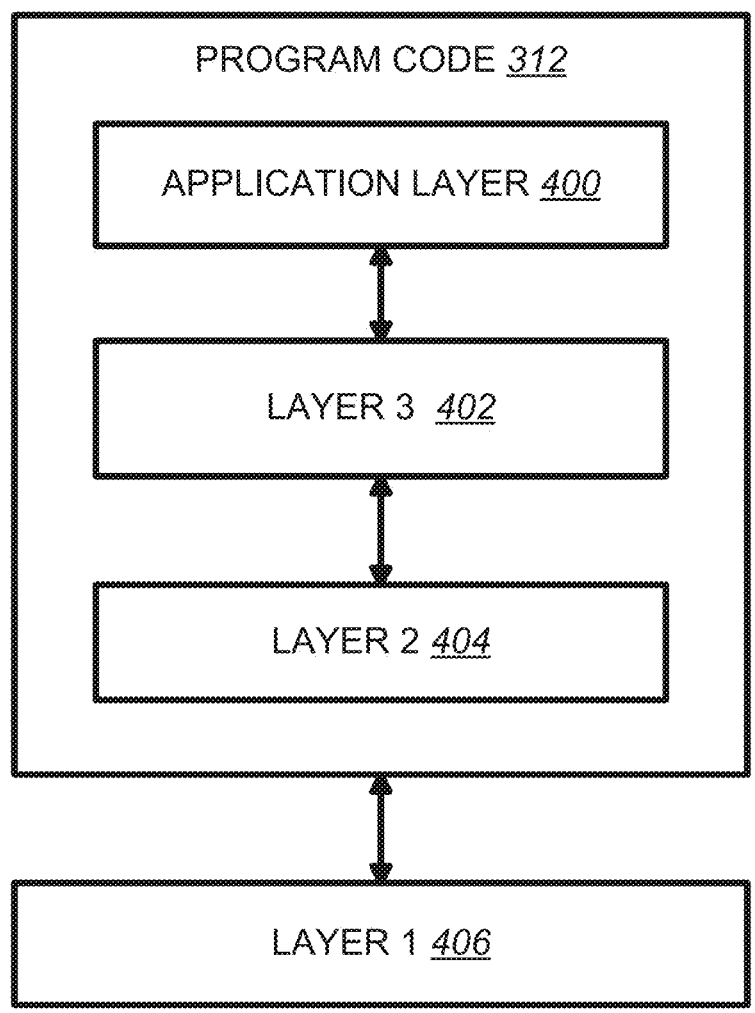
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In the Final Report of 3GPP TSG RAN WG1#AH_NR2 v1.0.0, an agreement is quoted below in which group common Downlink Control Information (DCI) is used for carrying preemption indication (PI).

Agreements

For downlink preemption indication
It is transmitted using a group common DCI in PDCCH
  Whether a UE needs to monitor preemption indication is configured by RRC signaling
  The granularity of preemption indication in time domain can be configured
In the Final Chairman's Note of 3GPP TSG RAN WG1 Meeting #90, the concept of reference downlink resource for preempted resource(s) is agreed.
Agreements:
Preempted resource(s) within a certain time/frequency region (i.e. reference downlink resource) within the periodicity to monitor group common DCI for pre-emption indication, is indicated by the group common DCI carrying the preemption indication
  The frequency region of the reference downlink resource is configured semi-statically
  The time region of the reference downlink resource is configured semi-statically
  The frequency granularity of pre-emption indication is configured to be y RBs within the reference downlink resource for the given numerology
    Note: The y RBs can correspond to the whole frequency region of the downlink reference resource.
  The time granularity of pre-emption indication is configured to be x symbols within the reference downlink resource for the given numerology
    Note: Time/frequency granularities of pre-emption indication should take into account the payload size of the group common DCI carrying the pre-emption indication
In the Final Chairman's Note of 3GPP TSG RAN WG1 Meeting #AH_NR3, some agreements related to group common DCI carrying PI is quoted below. One agreement introduces a TCI (Transmission Configuration Indication) in a DCI for Quasi-Co-Location (QCL) indication of data transmission.
Agreement:
A UE is RRC configured with a list of up to M candidate Transmission Configuration Indication (TCI) states at least for the purposes of QCL indication
  Whether M equal to or larger than $2^N$ is for further study, where N is the size of the DCI field for PDSCH
  FFS: Mapping between the candidate states to the states described by N bit DCI field for PDSCH
  Each TCI state can be configured with one RS Set
  Each ID (FFS: details of ID) of DL RS at least for the purpose of spatial QCL in an RS Set can refer to one of the following DL RS types:
    SSB
    Periodic CSI-RS
    Aperiodic CSI-RS
    Semi-persistent CSI-RS
Agreement:
The QCL configuration for PDCCH contains the information which provides a reference to a TCI state
  Alt 1: The QCL configuration/indication is on a per CORESET basis
    The UE applies the QCL assumption on the associated CORESET monitoring occasions. All search space(s) within the CORESET utilize the same QCL.
  Alt 2: The QCL configuration/indication is on a per search space basis
    The UE applies the QCL assumption on an associated search space. This could mean that in the case where there are multiple search spaces within a CORESET, the UE may be configured with different QCL assumptions for different search spaces.
  Note: The indication of QCL configuration is done by RRC or RRC+MAC CE
Agreement:
For QCL indication for PDSCH:
  When TCI states are used for QCL indication, the UE receives an N-bit TCI field in DCI
    The UE assumes that the PDSCH DMRS is QCL with the DL RS(s) in the RS Set corresponding to the signaled TCI state
      FFS: whether or not a QCL type is configured, configuration details are for further study
    Whether or not the TCI field is always present in a given DL-related DCI is FFS
Agreements:
UE can be configured to monitor the group common PDCCH for SFI and the group common DCI for DL preemption indication within the same or different CORESETs
Agreements:
  As a working assumption
    The time duration of the reference downlink resource for preemption indication equals to the monitoring periodicity of the group-common DCI carrying the preemption indication
  For determination of the frequency region of the reference downlink resource for preemption indication, down select between the following options in RAN1#90bis
    Option 1: The frequency region of the reference downlink resource is configured explicitly by RRC
    Option 2: The frequency region of the reference downlink resource is implicitly derived by the active DL BWP
Agreements:
  The minimum periodicity for UE to monitor group common DCI for DL preemption indication is down-selected between
    Option 1: one slot
    Option 2: less than a slot
In the Final Chairman's Note of 3GPP TSG RAN WG1 Meeting #90bis, some agreements are quoted below. One agreement describes reference downlink resources for preemption indication equals to monitoring periodicity of the group-common DCI carrying PI. In addition, slot level monitoring periodicity of PI is supported.
Agreements:
  The time duration of the reference downlink resource for pre-emption indication equals to the monitoring periodicity of the group-common DCI carrying the pre-emption indication
    In TDD, at least the semi-statically configured UL symbols are excluded from the reference downlink resource
      Note: This means the reference downlink resource only includes the DL or unknown symbols given by semi-static configuration within the semi-statically configured time duration of the reference downlink resource.

Agreements:
   For minimum monitoring periodicity of pre-emption indication:
      At least slot level monitoring periodicity of preemption indication is supported
Agreements:
   For slot level monitoring periodicity, UE is not required to monitor preemption indication for a slot in which PDSCH is not scheduled
   UE is not required to monitor preemption indication in DRX slots
   UE is not required to monitor preemption indication for the deactivated DL BWP
Agreements:
   The HARQ timeline for a PDSCH transmission is not affected by preemption indication.
Agreements:
   No consensus to introduce an explicit RRC configuration for frequency region of the reference downlink resource for pre-emption indication in Rel-15
   (working assumption) the frequency region of the reference downlink resource for pre-emption indication is the active DL BWP
Agreements:
   A fixed payload size (excluding CRC and potential reserved bits) of the group-common DCI carrying the downlink pre-emption indication (PI), in the format of a bitmap is used to indicate preempted resources within the semi-statically configured DL reference resource
      The bitmap indicates for one or more frequency domain parts (N>=1) and/or one or more time domain parts (M>=1)
         There is no RRC configuration involved in determining the frequency or time-domain parts
      The following combinations are supported and predefined {M, N}={14, 1}, {7, 2}
   A combination of {M,N} from this set of possible {M,N} is indicated 1 bit by RRC configuration for a UE
   In the Final Chairman's Note of 3GPP TSG RAN WG1 Meeting #91, based on the working assumption quoted below, the UE can receives a DCI carrying multiple PI corresponding to a configured mapping between each PI and a serving cell.
Working Assumption:
   DCI payload size for preemption indication is configurable by RRC
Agreements:
   Within a PUCCH group, UE can be configured to monitor group common PDCCH for pre-emption indication for a Scell on a different serving cell
      One DCI can contain one or more pre-emption indication field(s) corresponding one or more serving cells
         Each field (14 bits bitmap) for one serving cell
         RRC configures the PI field location in the DCI format that is applied to that cell
Agreements:
   Supported periodicities for slot level preemption monitoring are
   1, 2, TBD1, TBD2 slots
Agreements:
   No consensus to support mini-slot level monitoring periodicity of preemption indication in RAN1#91
Agreements:
   Confirm the following working assumption in RAN1#90bis
      The frequency region of the reference downlink resource for pre-emption indication is the active DL BWP Agreements:
   Configuration of UE monitoring of preemption indication is per DL BWP
Agreements:
   For the bitmap indication, the time-frequency blocks of the reference DL resource determined by {M, N} ({M, N}={14, 1}, {7, 2}) are indexed in frequency first manner
      Note: The reference DL resource is partitioned with M time domain parts and N frequency domain parts.
      Note: Current TS38.213 needs to be updated according to the above agreement.
Agreements:
   When a PI is detected, the time location of the corresponding reference DL resource (RDR) is determined by:
      The RDR starts at the $1^{st}$ symbol of the previous CORESET for PI monitoring and ends right before the current CORESET at which the PI is detected.
Agreements:
   The UE is not expected to take into account a PI detected in a BWP for a PDSCH scheduled in a different BWP of the same serving cell.

In 3GPP R1-1721342, DCI formats for scheduling of Physical Downlink Shared Channel (PDSCH) may comprise a field denoted as a Transmission Configuration Indication (TCI). The field indicates an association between Demodulation Reference Signal (DMRS) antenna ports of the receiving PDSCH and the one or more than one reference signal(s) which is one of the UE-specific Radio Resource Control (RRC) configured M TCIs. One DCI format, which is denoted as DCI format 2_1, is used for indicating a preemption indication.

7.3.1.2 DCI Formats for Scheduling of PDSCH
7.3.1.3.2 Format 2_1
DCI format 2_1 is used for notifying the PRB(s) and OFDM symbol(s) where UE may assume no transmission is intended for the UE.
The following information is transmitted by means of the DCI format 2_1:
   Identifier for DCI formats—[1] bits
   Pre-emption indication 1, Pre-emption indication 2, ... , Pre-emption indication N.
The size of DCI format 2_1 is configurable by higher layers, according to section 11.2 of [5, TS38.213]. Each pre-emption indication is 14 bits.

In 3GPP R1-1721343, the first quoted paragraph specifies the UE procedure for receiving control information. A Control Resource Set (CORESET) could be configured with an association between DMRS antenna port of receiving the CORESET and one or more than one reference signal(s). The second quoted paragraph specifies the UE's behavior related to current discontinuous transmission indication. A Network (NW) could configure a UE with one or more CORESET(s) for monitoring and receiving preemption indication.

10.1 UE Procedure for Determining Physical Downlink Control Channel Assignment
A set of PDCCH candidates for a UE to monitor is defined in terms of PDCCH search spaces. A search space can be a common search space or a UE-specific search space. A UE shall monitor PDCCH candidates in non-DRX slots in one or more of the following search spaces
   a Type0-PDCCH common search space for a DCI format with CRC scrambled by a SI-RNTI on a primary cell;
   a Type0A-PDCCH common search space for a DCI format with CRC scrambled by a SI-RNTI on a primary cell;

a Type1-PDCCH common search space for a DCI format with CRC scrambled by a RA-RNTI, or a TC-RNTI, or a C-RNTI on a primary cell;

a Type2-PDCCH common search space for a DCI format with CRC scrambled by a P-RNTI on a primary cell;

a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s); and a UE-specific search space for a DCI format with CRC scrambled by C-RNTI or CS-RNTI(s).

For a serving cell, higher layer signalling provides a UE with P control resource sets. For control resource set p, 0≤p<P where a UE-specific search space, a Type2-PDCCH common search space, or a Type3-PDCCH common search space is mapped, the higher layer signalling provides:

a control resource set index by higher layer parameter CORESET-ID;

a DM-RS scrambling sequence initialization value by higher layer parameter PDCCH-DMRS-Scrambling-ID;

a number of consecutive symbols provided by higher layer parameter CORESET-time-duration;

a set of resource blocks provided by higher layer parameter CORESET-freq-dom;

a CCE-to-REG mapping provided by higher layer parameter CORESET-CCE-to-REG-mapping-type;

a REG bundle size, in case of interleaved CCE-to-REG mapping, provided by higher layer parameter CORESET-REG-bundle-size;

a cyclic shift for the REG bundle interleaver [4, 38.211] by higher layer parameter CORESET-shift-index;

an antenna port quasi co-location, from a set of antenna port quasi co-locations provided by higher layer parameter TCI-StatesPDCCH, indicating quasi co-location information of the DM-RS antenna port for PDCCH reception;

an indication for a presence or absence of a transmission configuration indication (TCI) field for DCI format 1_0 or DCI format 1_1 transmitted by a PDCCH in control resource set p, by higher layer parameter TCI-PresentInDCI.

If the UE has not received an indication for an antenna port quasi co-location from the set of antenna port quasi co-locations provided by TCI-StatesPDCCH, the UE assumes that the DM-RS antenna port associated with PDCCH reception in the UE-specific search space is quasi co-located with the DM-RS antenna port associated with PBCH reception with respect to delay spread, Doppler spread, Doppler shift, average delay, and spatial Rx parameters.

11.2 Discontinuous Transmission Indication

If a UE is provided higher layer parameter Preemp-DL and Preemp-DL=ON, the UE is configured with an INT-ANTI provided by higher layer parameter INT-RNTI for monitoring PDCCH conveying DCI format 2_1 [5, TS 38.212]. The UE is additionally configured:

control resource set(s) and respective search space sets for monitoring PDCCH with DCI format 2_1 as described in Subclause 10.1;

a set of serving cells by higher layer parameter INT-cell-to-INT;

a mapping for each serving cell in the set of serving cells to a field in DCI format 2_1 by higher layer parameter cell-to-INT;

an information payload size for DCI format 2_1 by higher layer parameter INT-DCI-payload-length;

a monitoring periodicity for PDCCH with DCI format 2_1 by higher layer parameter INT-monitoring-periodicity;

an indication granularity for time-frequency resources by higher layer parameter INT-TF-unit.

If a UE detects a DCI format 2_1 for a serving cell from the configured set of serving cells, the UE may assume that no transmission to the UE is present in PRBs and in symbols, from a set of PRBs and a set of symbols of the last monitoring period, that are indicated by the DCI format.

The set of PRBs is equal to the active DL BWP as defined in Subclause 12 and includes $B_{INT}$ PRBs.

If a UE detects a DCI format 2_1 in a PDCCH transmitted in a control resource set in slot $m \cdot T_{INT}$, the set of symbols indicated by a field in DCI format 2_1 includes the last $14 \cdot T_{INT}$ symbols prior to the first symbol of the control resource set in slot $m \cdot T_{INT}$ where $T_{INT}$ is the value of the parameter INT-monitoring-periodicity and m is a natural number.

If the UE is configured with higher layer parameter UL-DL-configuration-common, symbols indicated as uplink by UL-DL-configuration-common are excluded from the last $14 \cdot T_{INT}$ symbols prior to the $O_{symbol}^{CORESET}$ symbol in slot $m \cdot T_{INT}$. The resulting set of symbols includes a number of symbols that is denoted as $N_{INT}$.

The UE is configured the indication granularity for the set of PRBs and for the set of symbols by higher layer parameter INT-TF-unit.

If the value of INT-TF-unit is 0, 14 bits of a field in DCI format 2_1 have a one-to-one mapping with 14 groups of consecutive symbols from the set of symbols where each of the first $N_{INT}-\lfloor N_{INT}/14 \rfloor \cdot 14$ symbol groups includes $\lceil N_{INT}/14 \rceil$ symbols, each of the last $14-N_{INT}+\lfloor N_{INT}/14 \rfloor \cdot 14$ symbol groups includes $\lfloor N_{INT}/14 \rfloor$ symbols, a bit value of 0 indicates transmission to the UE in the corresponding symbol group and a bit value of 1 indicates no transmission to the UE in the corresponding symbol group.

If the value of INT-TF-granularity is 1, 7 pairs of bits of a field in the DCI format 2_1 have a one-to-one mapping with 7 groups of consecutive symbols where each of the first $N_{INT}-\lfloor N_{INT}/7 \rfloor \cdot 7$ symbol groups includes $\lceil N_{INT}/7 \rceil$ symbols, each of the last $7-N_{INT}+\lfloor N_{INT}/7 \rfloor \cdot 7$ symbol groups includes $\lfloor N_{INT}/7 \rfloor$ symbols, a first bit in a pair of bits for a symbol group is applicable to the subset of $\lceil B_{INT}/2 \rceil$ first PRBs from the set of $B_{INT}$ PRBs, a second bit in the pair of bits for the symbol group is applicable to the subset of last $\lfloor B_{INT}/2 \rfloor$ PRBs from the set of $B_{INT}$ PRBs, a bit value of 0 indicates transmission to the UE in the corresponding symbol group and subset of PRBs, and a bit value of 1 indicates no transmission to the UE in the corresponding symbol group and subset of PRBs.

In 3GPP R1-1721344, the spatial association of PDSCH reception is quoted below.

5.1.5 Antenna Ports Quasi-Colocation

The UE can be configured up to M TCI-States by higher layer signalling to decode PDSCH according to a detected PDCCH with DCI intended for the UE and the given serving cell where M depends on the UE capability. Each configured TCI state includes one RS set TCI-RS-SetConfig. Each TCI-RS-SetConfig contains parameters for configuring quasi co-location relationship between the reference signals in the RS set and the DM-RS port group of the PDSCH. The RS set contains a reference to either one or two DL RSs and an associated quasi co-location type (QCL-Type) for each one configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types:

QCL-TypeA: {Doppler shift, Doppler spread, average delay, delay spread}
QCL-TypeB: {Doppler shift, Doppler spread}
QCL-TypeC: {average delay, Doppler shift}
QCL-TypeD: {Spatial Rx parameter}

The UE receives a selection command [10, TS 38.321] used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

If a UE is configured with the higher layer parameter TCI-PresentInDCI is set as 'Enabled' for the CORESET scheduling the PDSCH, the UE assumes that the TCI field is present in the DL DCI of the PDCCH transmitted on the CORESET. If TCI-PresentInDCI is set as 'Disabled' for the CORESET scheduling the PDSCH, for determining PDSCH antenna port quasi co-location, the UE assumes that the TCI state for the PDSCH is identical wo the TCI state applied for the CORESET used for the PDCCH transmission.

If the TCI-PresentinDCI is set as 'Enabled', the UE shall use the TCI-States according to the value of the 'Transmission Configuration Indication' field in the detected PDCCH with DCI for determining PDSCH antenna port quasi co-location. The UE may assume that the antenna ports of one DM-RS port group of PDSCH of a serving cell are quasi co-located with the RS(s) in the RS set with respect to the QCL type parameter(s) given by the indicated TCI state if the offset between the reception of the DL DCI and the corresponding PDSCH is equal to or greater than a threshold Threshold-Sched-Offset, where the threshold is FFS. For both the case when TCI-PresentInDCI ='Enabled' and TCI-PresentInDCI='Disabled' If the offset is less than a threshold, the UE may assume that the antenna ports of one DM-RS port group of PDSCH of a serving cell are quasi co-located based on the TCI state used for PDCCH quasi-colocation indication of the lowest CORESET-ID in the latest slot in which one or more CORESETs are configured for the UE.

Some or all of the following terminology and assumption may be used hereafter.

BS: a network central unit or a network node in NR which is used to control one or multiple TRPs which are associated with one or multiple cells. Communication between a BS and TRP(s) is via fronthaul. The BS may be referred to as central unit (CU), eNB, gNB, or NodeB.

TRP: a transmission and reception point provides network coverage and directly communicates with UEs. TRP may be referred to as distributed unit (DU) or network node.

Cell: a cell is composed of one or multiple associated TRPs, i.e., coverage of the cell is composed of coverage of all associated TRP(s). One cell is controlled by one BS. The cell may be referred to as TRP group (TRPG).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request (SR), channel state information (CSI), HARQ-ACK/NACK for downlink transmission Slot: a scheduling unit in NR. Slot duration is 14 OFDM symbols.

Mini-slot: a scheduling unit with duration less than 14 OFDM symbols.

Slot format information (SFI): Information of slot format of symbols in a slot. A symbol in a slot may belong to following type: downlink, uplink, unknown, or other. The slot format of a slot could at least convey transmission direction of symbols in the slot.

DL common signal: data channel carrying common information that targets for multiple UEs in a cell or all UEs in a cell. Example of DL common signal could be system information, paging, RAR.

DL URLLC: A type of DL transmission which requires very high reliability and very low latency. To fulfill the latency requirement, an example is to transmit DL URLLC in a mini-slot, e.g. the data duration could be less than 1 slot such as 1~4 OFDM symbol(s) and there may be one or multiple monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

In a wireless communication system, radio resource utilization efficiency is important for a NW to schedule UEs with multiple and/or different services.

In 5G NR, multiple services with different requirements are expected to be supported. Broadly, services may be classified as follows: services requiring very low latency and high reliability, i.e., Ultra Reliable Low Latency Communication (URLLC); services requiring very high data rates, i.e., Enhanced Mobile Broadband (eMBB); or services with enhanced coverage, i.e., Massive Machine Type Communication (mMTC). However, the different services mentioned above may need different time durations and/or different subcarrier spacings (SCS). For example, it is beneficial to transmit on a fewer number of Orthogonal Frequency Division Multiplexing (OFDM) symbols and/or to transmit via a higher SCS value to meet URLLC requirement. However, for other services, latency is not the highest priority.

From the NW's point of view, how to multiplex different services with different requirements in an efficient way needs to be considered. One way is via a frequency division multiplexing (FDM) manner. The NW could schedule services with different quality of service (QoS) requirements on different frequency resources. However, it may encounter a problem where there are no available and/or no sufficient frequency resources for some services. For example, delay-sensitive services (i.e. URLLC) may be transmitted on resources with a higher SCS which may occupy much more frequency resources to meet the latency requirement. In some situations (i.e., a narrow system bandwidth, much more delay-tolerable services relative to delay-sensitive services), multiplexing services with different QoS requirements in a FDM manner is not suitable. One way is via a time division multiplexing (TDM) manner. The NW could schedule different services at different times. However, considering delay-sensitive services, waiting for the next transmission occasion in TDM manner may not satisfy requirement of the delay-sensitive services. Hence, allowing a delay-sensitive service to be prioritized over a delay-tolerable service is considered. For example, when data of a delay-sensitive service arrives, the NW could prioritize to schedule the delay-sensitive service on resources which have been scheduled for delay-tolerable services. Surely, it may puncture data or information on the resources already scheduled for delay-tolerable services.

Accordingly, the concept of preemption indication (PI) is introduced. The NW could indicate PI to UEs with delay-tolerable services in order to compensate for reception performance of retransmission. Some detailed procedures relative to PI are mentioned in 3GPP R1-1721344. In case a UE is configured to monitor group common PDCCH for receiving PI, the receiving PI could assist the UE to drop and/or ignore part of transmission impacted by delay-sensitive services which may be scheduled for other UE(s). Considering retransmission with chase combining, dropping and/or ignoring impacted part of the previous/first transmission could improve decoding performance.

Figure 5:
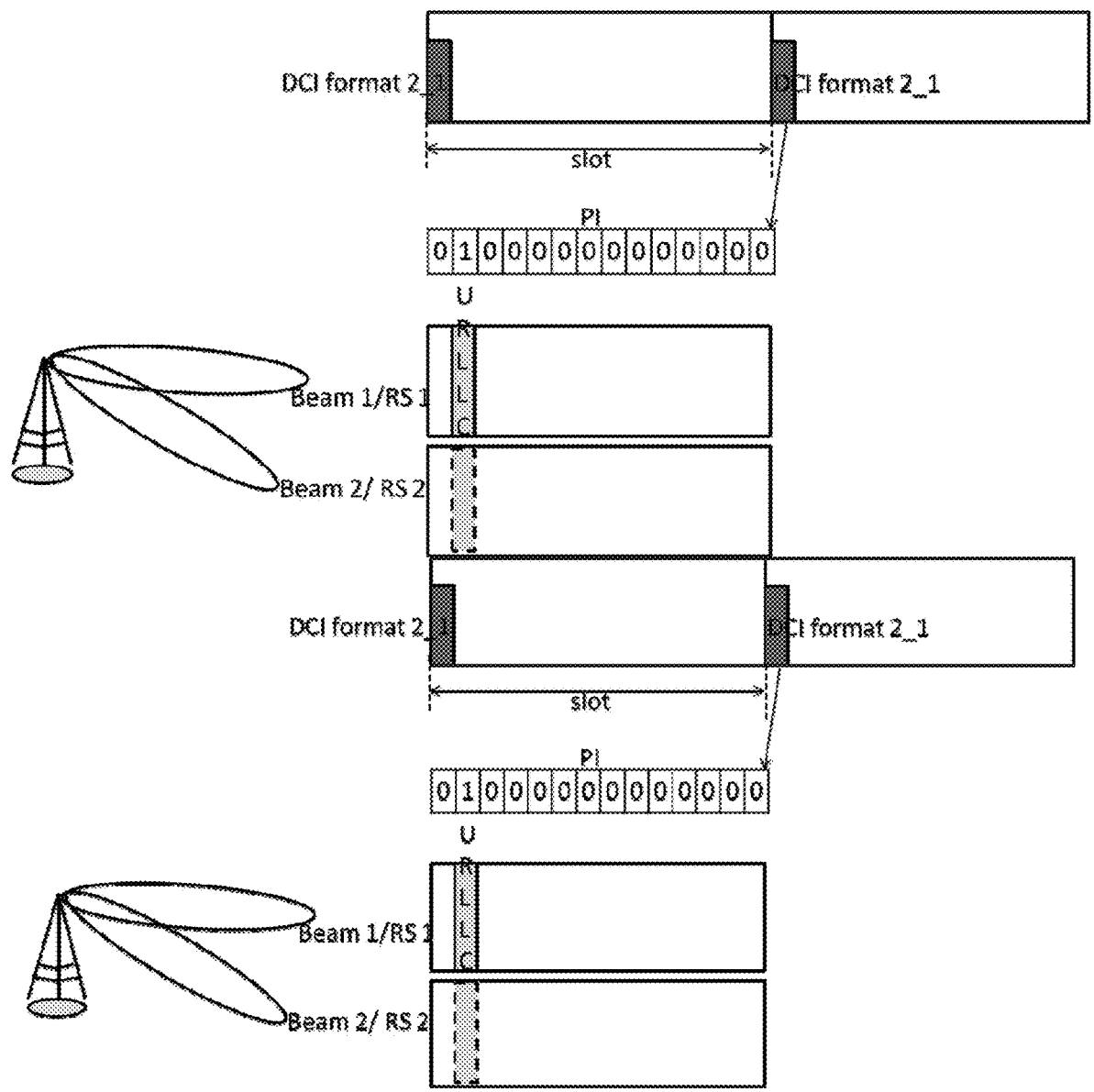
FIG. 5 illustrates a scenario in which the preemption indication (PI) may cause unnecessary data drops.

Based on the Final Report of 3GPP TSG RAN WG1#AH_NR2 v1.0.0, the PI is carried by a group common PDCCH. Different group common PDCCHs may indicate different PIs. A group could be constructed based on same characteristics such as the same control resource set (CORESET), same bandwidth part, same numerology, same subcarrier spacing, same NW beam, same TRP, same Radio Network Temporary Identifier (RNTI), or the same area served by a set of NW beams. However, some grouping rules may cause unnecessary dropping and/or ignoring. For example, UEs which could be reached by any one of NW beam1 and NW beam2 is constituted as a group. In this situation, indicating a PI of the group may cause unnecessary dropping for UEs communicating with NW via beam 2 if data of a delay-sensitive service (i.e. URLLC) is transmitted via NW beam1. That is, those UEs scheduled on the resources via NW beam2 will drop the impacted resources based on the PI of the group. For example, in FIG. 5, if a UE receives data (e.g., eMBB data) based on beam 2 during the first slot and receives a DCI format 2_1 indicating preemption indication (PI) in the second slot, the UE may process/flush the data based on PI in DCI format 2_1 even interference (e.g., URLLC) is transmitted via beam 1. How to enhance resource utilization efficiency of PI of a group needs to be considered. Potential solutions are described below.

According to one embodiment, pre-emption indication (PI) is provided for each beam (beam group)/reference signal (reference signal set). When a UE receives data based on a first beam (group)/a first reference signal (set), the UE processes the data according to a corresponding PI for the first beam (group)/a first reference signal (set). The UE does not process data according to PI for beams (groups) which is not scheduled for data reception, e.g. a second beam (group). The UE does not process the data according to the PI for a second beam (group)/a second reference signal set. In one method, a group common PDCCH (e.g., DCI format 2_1) on a beam could provide a PI for its own beam (group). Alternatively, a group common PDCCH on a beam could provide a PI for all beams (groups). In another alternative, a group common PDCCH on a beam could provide a PI for multiple beams (groups). The UE may monitor or receive PI(s) for configured beams (groups). The UE may monitor or receive PI(s) for beams (groups) with scheduled data. In one embodiment, a beam is represented by a reference signal which serves as quasi co-location reference. In another embodiment, a beam is represented by a TCI state.

Figure 6:
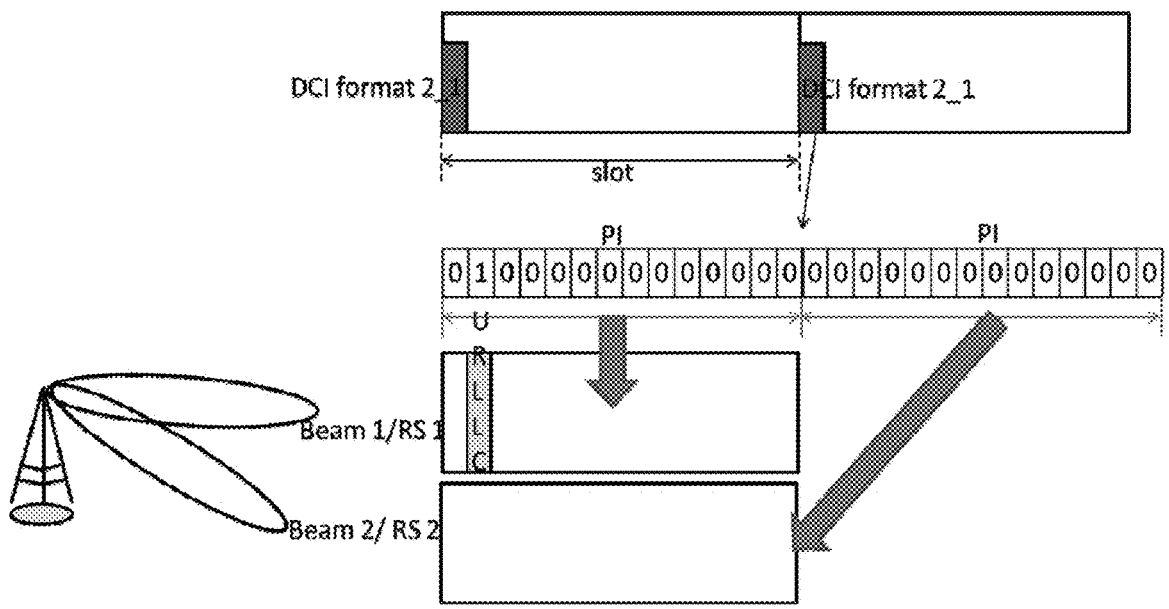
FIG. 6 illustrates an exemplary embodiment in which a UE is configured with 2 PIs.

In one method, a UE is configured with a plurality of reference signals (sets). Each reference signal (set) could provide a reference for indicating quasi co-location relationship. The plurality of reference signal sets at least comprise a first reference signal set. The plurality of reference signal sets at least comprises a second reference signal set. Alternatively, each reference signal (set) is configured in a cell. The UE is served by a network in a cell. A reference signal set could be constructed based on the same characteristic such as the same CORESET control resource set, same bandwidth part, same numerology, same subcarrier spacing, same NW beam, same TRP, same RNTI, or a same area served by a set of NW beams. For example, a channel could be indicated to be quasi co-located with one or more of the plurality of reference signals (sets). Each reference signal (set) could be used to indicate a reception beam(s) or a transmission beam(s) for a channel or a signal. The reference signal (set) is a TCI-RS-SetConfig. The UE could be configured with the reception of a preemption indication (PI). The UE could associate one PI with one or multiple reference signals (sets). The association between one PI and one or multiple reference signals (sets) could be configured or indicated to the UE. In one example, the association indicates a PI position for each reference signal (set). In another example, the association indicates a RNTI for the control information of a PI for each reference signal (set). The UE could be configured with a position of a PI for each reference signal (set). The plurality of reference signals (sets) and the associated positions of the PI could be configured in the same message. Alternatively, there is an indication associated with a PI indicating reference signal(s) (set(s)) associated with the PI. For example, if a UE is configured with the reception of PI, and the UE is configured with 12 reference signals for quasi co-location, the UE could associate a PI with one or more of the 12 reference signals. The UE could be configured with 12 positions to receive the PI, in which each position is associated with one reference signal. It is noted that the UE may be configured with fewer positions if multiple reference signal(s) (sets) is/are associated with a PI position. Since a PI has 14 bits, a PI position could be indicated based on an integer multiple of 14 (e.g., 0, 14, 28, . . . ). Alternatively, the PI position is based on the number of PIs in a downlink control information (DCI), e.g., a first PI in a DCI or third PI in a DCI. The PI position is a starting position of a PI in a downlink control information (DCI). For example, in FIG. 6, a UE could be configured with two PI in a DCI format 2_1, wherein the first PI is used for beam 1/RS 1 and the second PI is used for beam 2/RS 2. In this example, if the UE has a data transmission in the first slot based on beam 2/RS 2, the UE could not process/flush/drop since the second PI indicates no (other) transmission based on the beam 2/RS 2 in the first slot.

In another method, the UE could be configured with a set of control information. The UE could associate a control information for carrying a PI with each reference signal (set). The control information includes at least one PI. The UE could be configured with the size of each control information. Alternatively, the UE could be configured with a number of PIs carried by each control information. The control information could be a downlink control information (DCI). For example, the UE could be configured with a DCI format size for receiving multiple PIs. Based on the indication of the association, the UE could be aware of the PI of each reference signal (set) in a DCI.

According to another method, the UE could be configured with a CORESET for monitoring the set of control information carrying the PI. The UE could associate a CORESET with each TCI state. The UE could monitor the PI for each TCI state according to the association.

In another method, the UE could be configured with a RNTI for monitoring the set of control information. Alternatively, the UE could be configured with a set of RNTI values for monitoring the set of control information. The UE could associate one RNTI within the set of RNTIs with a reference signal (set). This association could be done by a configuration. The UE monitors the control information of a reference signal (set) according to an associated RNTI of the reference signal (set).

Based on the association, the UE could be aware of the PI of each reference signal (set). More specifically, based on the set of the RNTI values and/or the set of CORESETs, the UE could monitors a control information carrying PI of a reference signal (set) by a (associated) RNTI value on a (associated) CORESET.

In another method, the UE could be configured with a monitoring periodicity for monitoring a control information carrying PI. The UE monitors for a control information carrying PI on a configured monitoring occasion if the UE receives a signal before the configured monitoring occasion. The signal could be a data-related signal or a control-related signal. In one embodiment, the signal could be a data channel carrying at least one transport block.

If the UE receives a signal which is quasi co-located with a reference signal (set), the UE monitors for a control information carrying PI of the reference signal (set) on the next monitoring occasion. If the UE receives a signal, which is quasi co-located with a reference signal (set), the UE does not monitor a control information not carrying a PI of the reference signal (set) on the next monitoring occasion. If the UE does not receive a signal which is quasi co-located with a reference signal (set), the UE could skip monitoring for the control information carrying PI on the next monitoring occasion.

If a UE receives a control information carrying PI of a reference signal (set) and the UE receives a signal which is quasi co-located with the reference signal (set), the UE may drop part of the signal based on the PI of the reference signal (set).

In another method, the UE could be configured with a table. Each entry of the table indicates a combination of reference signals (sets). In one method, the size of the table could be fixed. Alternatively, the size of the table could depend on size of the reference signals (sets). In this method, the UE receives a control information. The control information carries at least one PI and a number of bits indicating an entry of the table. The UE could associate the PI with reference signals (sets) by a combination indicated by the entry. The UE could be configured with the size of the control information.

The UE monitors for the control information on a configured monitoring occasion if the UE receives a signal before the configured monitoring occasion. If the UE does not receive a signal, the UE could skip the monitoring for control information on a configured monitoring occasion.

If the UE receives a signal which is quasi co-located with a reference signal (set) and receives the control information indicating an entry of the table which comprises the reference signal (set), the UE could drop part of the signal based on the PI carried by the control information. If the UE receives a signal which is quasi co-located with a reference signal (set) and receives the control information indicating an entry of the table which does not include the reference signal (set), the UE could ignore the PI carried by the control information.

The UE monitors for a control information carrying preemption indication (PI) in a control resource set (CORESET) if the UE receives a signal before a monitoring occasion. The monitoring occasion is determined based on a monitoring periodicity of the control information carrying PI.

If the UE does not receive a signal, the UE could skip the monitoring for the control information carrying a PI on the monitoring occasion. If a UE receives a data signal which is scheduled by a scheduling control signal and the data signal is quasi co-located with a reference signal (set) before a monitoring occasion, the UE may monitor a control information carrying a PI of the reference signal (set). The UE monitors the control information carrying a PI of the reference signal (set) on a CORESET, which is used to carry the scheduling control signal. The UE monitors the control information carrying PI of the reference signal (set) on a CORESET which is quasi co-located with a reference signal (set). The UE monitors the control information carrying the PI of the reference signal (set) on a CORESET which is quasi co-located with the data signal.

In another method, a UE is configured with a plurality of TCI states. The UE could be configured with the reception of a PI. The UE could associate one PI with one or more TCI state(s). The association between one PI and one or more TCI state(s) could be configured or indicated to the UE. In one example, the association is used to indicate a PI position for each TCI state. In another example, the association is used to indicate a RNTI for the control information of a PI for each TCI state. The UE could be configured with a position of the PI for each TCI state. The plurality of TCI states and the associated positions of the PI could be configured in the same message. Alternatively, there is an indication associated with a PI indicating the TCI state(s) that the PI is associated with. For example, if a UE is configured with the reception of the PI and the UE is configured with 8 TCI states, the UE could associate a PI with one or more of the 8 TCI states. The UE could be configured with 8 positions to receive a PI, wherein each position is associated with one TCI state. It is noted that the UE may be configured with fewer positions if multiple TCI states are associated with a PI position. Since a PI is composed of 14 bits, a PI position could be indicated based on multiples of 14 (e.g., 0, 14, 28, etc.). Alternatively, the PI position is based on the number of PIs in a DCI, e.g., a first PI in a DCI or a third PI in a DCI. Alternatively, the PI position is a starting position of a PI in a downlink control information (DCI).

In one method, the UE could be configured with a set of control information. The UE could associate the control information for carrying a PI with each TCI state. The control information includes at least one PI. The UE could be configured with the size of each control information. The UE could be configured with a number of PIs carried by each control information. The control information could be DCI. For example, the UE could be configured with a DCI format size for receiving multiple PIs. Based on the indication of the association, the UE could be aware of that PI from each TCI state in a DCI.

In another method, the UE could be configured with a set of CORESET for monitoring the set of the control information carrying a PI. The UE could associate a CORESET with each TCI state. The UE could monitor a PI for each TCI state according to the association.

In one method, the UE could be configured with a RNTI for monitoring a set of control information. Alternatively, the UE could be configured with a set of RNTI values for monitoring the set of control information. The UE could associate one RNTI within the set of RNTIs with a TCI state. The association could be made by a configuration. The UE monitors the control information of a reference signal (set) according to an associated RNTI of the TCI state.

Based on the association, the UE could be aware of the PI for each TCI state. More specifically, based on the set of the RNTI values and/or the set of CORESETs, the UE could monitor a control information carrying PI of a TCI state by a RNTI value or an associated RNTI value on a CORESET or an associated CORESET.

If the UE receives a signal with a TCI state, the UE monitors for a control information carrying a PI of the TCI state on the next monitoring occasion. If the UE receives a signal with a TCI state, the UE does not monitor a control information not carrying a PI of the TCI state on the next monitoring occasion. If the UE does not receive a signal with a TCI state, the UE could skip the monitoring for the control information carrying a PI on next monitoring occasion.

If a UE receives a control information carrying a PI of a TCI state and the UE receives a signal with the TCI state, the UE may drop part of the signal based on the PI of the TCI state.

In one method, the UE could be configured with a table. Each entry of the table indicates a combination of the TCI states. In one embodiment, the size of the table could be fixed. Alternatively, the size of the table could depend on the size of the TCI state. The UE receives a control information that carries at least one PI and a number of bits indicating an entry of the table. The UE could associate the PI with the TCI state(s) within a combination indicated by the entry. The UE could be configured with the size of the control information.

If the UE receives a signal with a TCI state and receives the control information indicating an entry of the table which includes the TCI state, the UE could drop part of the signal based on the PI carried by the control information. Alternatively, if the UE receives a signal with a TCI state and receives the control information indicating an entry of the table which does not include the TCI state, the UE could ignore the PI carried by the control information.

If a UE receives a data signal with a TCI state which is scheduled by a scheduling control signal, the UE may monitor a control information carrying the PI of the TCI state. The UE monitors the control information carrying the PI of the TCI state on a CORESET, which is used to carry the scheduling control signal. The UE monitors the control information carrying the PI of the TCI state on a CORESET which is quasi co-located with a reference signal (set). The UE monitors the control information carrying the PI of the TCI state on a CORESET, which is quasi co-located with the data signal.

A UE could be implicitly indicated whether the UE process/flush/drop part of data based on PI/DCI format 2_1.

If the UE receives a first data based on a first reference signal/beam, the UE could monitor the PI/DCI format 2_1 based on a second reference signal/beam. If the UE receives a second data based on a third reference signal/beam, the UE could monitor PI/DCI format 2_1 based on a fourth reference signal/beam. In one method, a reference signal could be Demodulation Reference Signal (DMRS) of a channel/CSI-RS/SS-PBCH block.

More specifically, the first reference signal/beam could be the same as the second reference signal/beam. In one embodiment, the first reference signal serves as a quasi co-location reference. In one embodiment, the second reference signal serves as a quasi co-location reference. In one embodiment, the first reference signal/beam and the second reference signal/beam belong to a first (same) group. The second reference signal/beam is configured to the UE for monitoring PI/DCI format 2_1. The second reference signal/beam is served for monitoring the PI/DCI format 2_1 for the first group. For example, if a group is exemplified as {RS1, RS2} and RS2 is served for monitoring PI/DCI format 2_1 for the group, the UE may monitor PI/DCI format 2_1 based on "RS2".

More specifically, the third reference signal/beam could be the same as the fourth reference signal/beam. In one embodiment, the third reference signal serves as a quasi co-location reference. In one embodiment, the fourth reference signal serves as a quasi co-location reference. The third reference signal/beam and the fourth reference signal/beam belong to a second (same) group, which is different from the first group. The fourth reference signal/beam is configured to the UE for monitoring PI/DCI format 2_1. The fourth reference signal/beam is served for monitoring PI/DCI format 2_1 for the second group.

In one method, the first group and the second group are jointly separated. In other words, a reference signal/beam in the first group is not in the second group. For example, the first group could be exemplified as {RS1, RS2} and the second group could be exemplified as {RS3, RS4}. Alternatively, the first group and the second group could include partially the same reference signal/beam. For example, the first group could be exemplified as {RS1, RS2 } and the second group could be exemplified as {RS2, RS3, RS4}.

If the UE detects/decodes a PI/DCI format 2_1 based on the second reference signal successfully, the UE may process the first data based on the PI/DCI format 2_1. In other words, the UE may drop/flush part of the first data based on the PI/DCI format 2_1. If the UE does not detect/decode a PI/DCI format 2_1 based on the fourth reference signal, the UE does not process the second data based on the PI/DCI format 2_1 which is detected/decoded based on the second reference signal. The UE does not drop/flush part of the second data based on the PI/DCI format 2_1 (which is detected/decoded based on the second reference signal).

In one embodiment, the UE receives data based on a reference signal that could be equivalent to perform channel estimation based on the reference signal.

In one embodiment, the UE could be configured with a CORESET and/or a search space for monitoring PI/DCI format 2_1. Alternately, the UE may monitor the PI/DCI format 2_1 on the CORESET based on a periodicity. Alternately, the periodicity is the periodicity of monitoring PI/DCI format 2_1.

Figure 7:
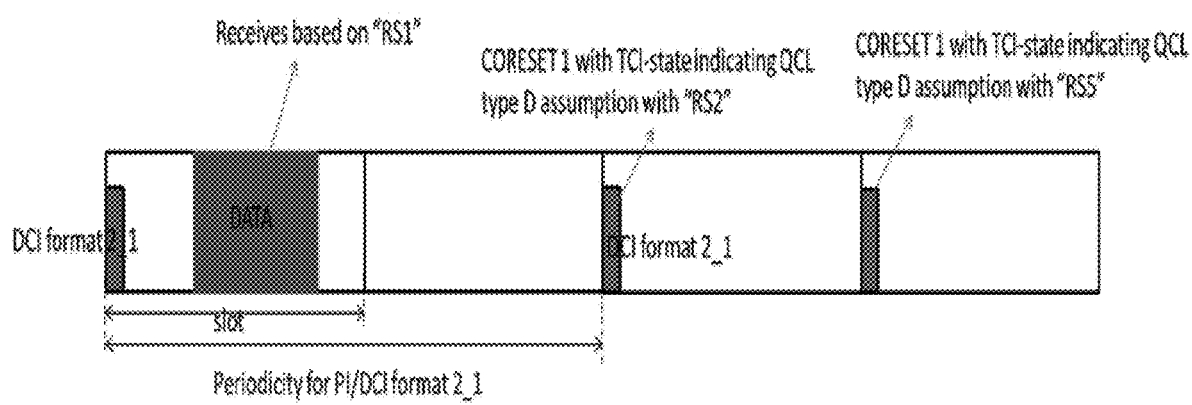
FIG. 7 illustrates an exemplary embodiment in which in which a UE monitors and processes data.

In one embodiment, if the UE is configured to monitor PI/DCI format 2_1 on the CORESET, the UE may detect/decode the CORESET based on a reference signal. Alternately, the reference signal could be a non-activated TCI-state for the CORESET. Alternately, the reference signal could be the reference signal for receiving data. For example, in FIG. 7, assuming a first group could be exemplified as {RS1, RS2} and the UE may monitor PI/DCI format 2_1 based on "RS2" for the first group. Assuming a second group could be exemplified as {RS3, RS4} and the UE may monitor PI/DCI format 2_1 based on "RS4" for the second group. The UE is configured to receive PI/DCI format 2_1 every 2 slots on "CORESET 1", which is configured with an activated TCI state indicating QCL type D assumption with "RS5". The UE may receive/decode/detect/monitor PI/DCI format 2_1 on "CORESET 1" in the third slot based on "RS2" or "RS1". The UE does not receive/decode/detect/monitor PI/DCI format 2_1 on the third slot based on "RS5". In another example, the UE could receive/decode/detect/monitor "CORESET 1" based on "RS5" in the fourth slot if "CORESET 1" in that monitoring occasion is not used for monitoring PI/DCI format 2_1.

Figure 8:
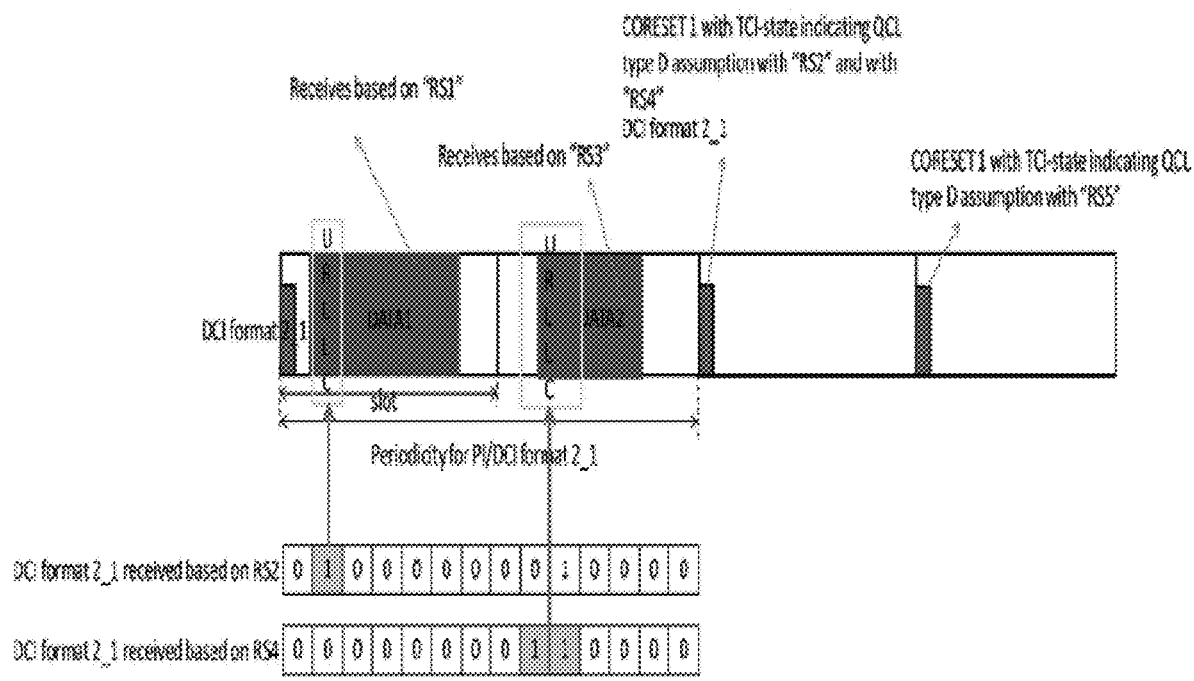
FIG. 8 illustrates an exemplary embodiment in which a UE monitors and processes data.

In this example, if the UE detects PI/DCI format 2_1 based on "RS2" successfully, the UE could process the data based on PI/DCI format 2_1 detected based on "RS2". In a similar example, if the UE receives another data (e.g., DATA 2), the UE does not expect to receive DATA 2 based on RS which is not in the group (e.g., RS1, RS2). Alternately, the UE may monitor PI/DCI format 2_1 on "CORESET 1" in the third slot based on "RS2" and based on "RS4". As shown in FIG. 8, the UE may process DATA 1 based on PI/DCI format 2_1 received based on "RS2" and does not process DATA 2 based on PI/DCI format 2_1 received based on "RS2".

Figure 9:
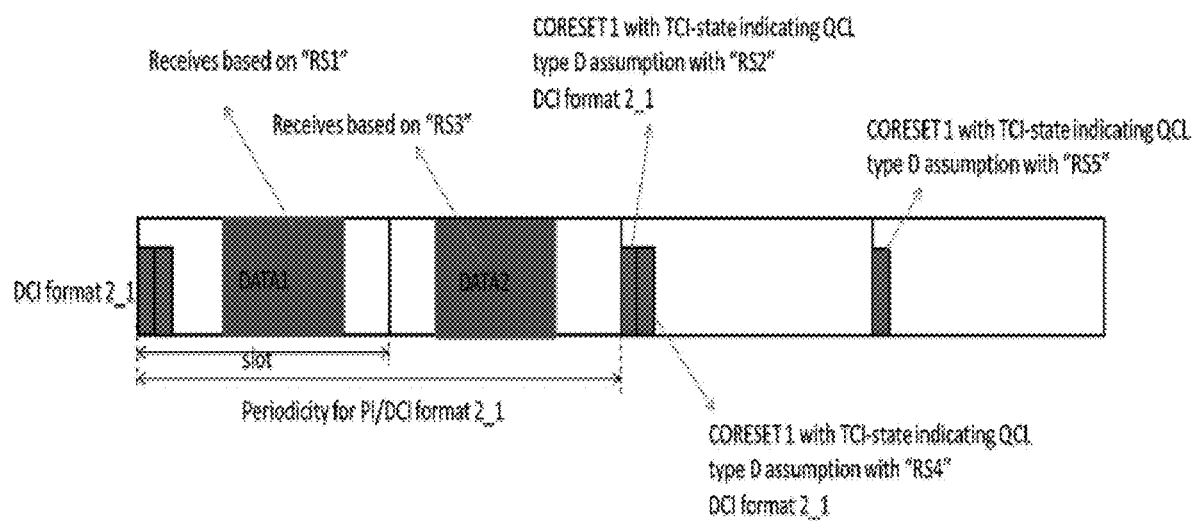
FIG. 9 illustrates an exemplary embodiment in which a UE monitors and processes data.

In one alternative, the search space for the PI/DCI format 2_1 could be multiple monitoring occasions within a slot and/or may be not aligned the slot boundary. For example, in FIG. 9, "CORESET 1" could a 1 symbol CORESET and search space configuration (e.g., monitoringSymbolsWithinSlot) for PI/DCI format 2_1 could indicate "11000000000000". In this example, in the third slot, the UE could monitor/detect/decode/receive the first monitoring occasion for PI/DCI format 2_1 based on "RS2". The UE may monitor/detect/decode/receive the first monitoring occasion in the third slot for PI/DCI format 2_1 based on "RS4".

According to one exemplary method, the UE receives a data via a first beam, wherein the UE processes the data according to a corresponding preemption indication (PI) for the first beam. According to another exemplary method, the UE is configured with a table, wherein each entry of the table indicates a combination of a set of beams.

In another method, the UE does not process the data according to a PI for other beam(s) which is/are not scheduled for the data.

In one or more of the above-disclosed methods, a PI is conveyed by a group common PDCCH which is associated to the first beam.

In one or more of the above-disclosed methods, the group common PDCCH provides at least one PI for at least one beam. Alternatively, the group common PDCCH provides the PI for all configured beams. In another alternative, the group common PDCCH provides the PI for a number of beams. In yet another alternative, the group common PDCCH provides the PI for at least one beams.

In one or more of the above-disclosed methods, the UE monitors or receives for PI(s) for the configured beams.

In one or more of the above-disclosed methods, the UE monitors or receives PI(s) for the first beam.

In one or more of the above-disclosed methods, a beam is represented by a reference signal which serves as a quasi co-location reference.

In one or more of the above-disclosed methods, a beam is represented by a TCI state.

In one or more of the above-disclosed methods, the UE is configured with a plurality of reference signals. In an alternate method, each reference signal provides a reference for indicating a quasi co-location relationship. In another method, each reference signal is used to indicate a reception beam(s) or a transmission beam(s) for a channel or a signal.

In one or more of the above-disclosed methods, the UE is configured with the reception of a PI.

In one or more of the above-disclosed methods, the UE associates one PI with one or multiple reference signals.

In one or more of the above-disclosed methods, an association between one PI and one or multiple reference signals is configured or indicated to the UE.

In one or more of the above-disclosed methods, the UE is configured with a position of the PI for each reference signal.

In one or more of the above-disclosed methods, the plurality of reference signals and the associated positions of the PI are configured in a same message.

In one or more of the above-disclosed methods, there is an indication associated with a PI indicating reference signal(s) the PI is associated with.

In one or more of the above-disclosed methods, the UE may be configured with fewer positions if multiple reference signal(s) are associated with a PI position. In one method, the PI position is based on number of PIs in a DCI. Alternatively, the PI position is a starting position of a PI in a DCI.

In one or more of the above-disclosed methods, the UE is configured with a set of CORESET for monitoring the set of control information carrying the PI.

In one or more of the above-disclosed methods, the UE associates a CORESET with each reference signal.

In one or more of the above-disclosed methods, the UE monitors a PI for each reference signal according to the association.

In one or more of the above-disclosed methods, the UE is configured with a set of control information.

In one or more of the above-disclosed methods, the UE associates a control information for carrying a PI with each reference signal. In one method, the control information comprises at least one PI.

In one or more of the above-disclosed methods, the LTE is configured with the size of each control information.

In one or more of the above-disclosed methods, the UE is configured with a number of PIs carried by each control information. In one method, the control information is DCI.

In one or more of the above-disclosed methods, based on indication of the association, the UE is aware of that the PI of each reference signal in a DCI.

In one or more of the above-disclosed methods, the UE is configured with a RNTI for monitoring the set of control information.

In one or more of the above-disclosed methods, the UE is configured with a set of RNTI values for monitoring the set of control information.

In one or more of the above-disclosed methods, the UE associates one RNTI within the set of RNTIs with a reference signal. In one or more of the above-disclosed methods, the association is done by a configuration.

In one or more of the above-disclosed methods, the UE monitors the control information of a reference signal according to an associated RNTI of the reference signal.

In one or more of the above-disclosed methods, based on the association, the UE is aware of the PI of each reference signal.

In one or more of the above-disclosed methods, based on the set of the RNTI values and/or the set of CORESETs, the UE monitors a control information carrying a PI of a reference signal by a RNTI value or an associated RNTI value on a CORESET or an associated CORESET.

In one or more of the above-disclosed methods, the UE could be configured with a monitoring periodicity for monitoring a control information carrying the PI.

In one or more of the above-disclosed methods, if the UE receives a signal which is quasi co-located with a reference signal, the UE monitors for a control information carrying the PI of the reference signal on the next monitoring occasion.

In one or more of the above-disclosed methods, if the UE receives a signal which is quasi co-located with a reference signal, the UE does not monitor a control information not carrying the PI of the reference signal on the next monitoring occasion.

In one or more of the above-disclosed methods, if the UE does not receive a signal which is quasi co-located with a reference signal, the UE could skip the monitoring for control information carrying the PI on next monitoring occasion.

In one or more of the above-disclosed methods, if a UE receives a control information carrying PI of a reference signal and the UE receives a signal which is quasi co-located with the reference signal, the UE may drop part of the signal based on the PI of the reference signal.

In one or more of the above-disclosed methods, the UE is configured with a table.

In one or more of the above-disclosed methods, each entry of the table indicates a combination of the reference signals.

In one or more of the above-disclosed methods, the size of the table is fixed. Alternatively, the size of the table depends on size of the reference signals.

In one or more of the above-disclosed methods, the UE receives a control information. In one method, the control information carries at least one PI and a number of bits indicates an entry of the table.

In one or more of the above-disclosed methods, the UE associates the PI with reference signals (sets) within the combination indicated by the entry.

In one or more of the above-disclosed methods, the UE is configured with the size of the control information.

In one or more of the above-disclosed methods, the UE monitors for the control information on a configured monitoring occasion if the UE receives a signal before the configured monitoring occasion.

In one or more of the above-disclosed methods, if the UE does not receive a signal, the UE could skip monitoring for the control information on a configured monitoring occasion.

In one or more of the above-disclosed methods, if the UE does not receive a signal, the UE could skip the monitoring for the control information on a configured monitoring occasion.

In one or more of the above-disclosed methods, if the UE receives a signal which is quasi co-located with a reference signal and receives the control information indicating an entry of the table which comprises the reference signal, the UE drops part of the signal based on the PI carried by the control information.

In one or more of the above-disclosed methods, if the UE receives a signal which is quasi co-located with a reference signal and receives the control information indicating an entry of the table which does not comprise the reference signal, the UE could ignore the PI carried by the control information.

According to one exemplary method, the UE is configured with a set of spatial associations and a mapping for each spatial association in the set, wherein the mapping indicates a position of a PI for each spatial association in the set of spatial associations.

In one or more of the above-disclosed methods, the UE is configured with a set of control information.

In one or more of the above-disclosed methods, the mapping indicates a control information in the set of control information for carrying the PI of each spatial association in the set of spatial associations.

In one or more of the above-disclosed methods, the control information in the set of control information comprises at least one PI.

In one or more of the above-disclosed methods, one PI comprises 14 bits.

In one or more of the above-disclosed methods, the UE is configured with the size of each control information.

In one or more of the above-disclosed methods, the UE is configured with a number of PIs carried by each control information.

In one or more of the above-disclosed methods, the number of bits for representing the position of a spatial association in the set depends on the number of PIs in a control information.

In one or more of the above-disclosed methods, the UE is configured with the reception of PI.

In one or more of the above-disclosed methods, the UE is configured with a set of CORESET for monitoring the set of control information carrying the PI.

In one or more of the above-disclosed methods, the mapping indicates a CORESET in the set of CORESETs for monitoring the control information carrying the PI of each spatial association in the set of spatial associations.

In one or more of the above-disclosed methods, the UE is configured with a RNTI value for monitoring the set of control information.

In one or more of the above-disclosed methods, the UE is configured with a set of RNTI values for monitoring the set of control information.

In one or more of the above-disclosed methods, the mapping indicates that a RNTI value in the set of RNTI values is used for monitoring the control information carrying the PI of at least one spatial association in the set of spatial associations.

In one or more of the above-disclosed methods, the UE monitors for the control information in the set of control information by a RNTI value in the set of RNTI values.

In one or more of the above-disclosed methods, the mapping indicates a RNTI values for monitoring the control information carrying the PI of a spatial association in the set. In one method, the mapping comprises a bit field indicating a group index for at least one spatial association in the set of spatial associations.

In one or more of the above-disclosed methods, the size of the bit field is determined based on the UE's capabilities.

In one or more of the above-disclosed methods, the UE is configured with at least a monitoring periodicity for the control information.

In one or more of the above-disclosed methods, the UE monitors for a control information carrying the PI on a configured monitoring occasion if the UE receives a signal before the configured monitoring occasion.

In one or more of the above-disclosed methods, if the UE receives a signal via a spatial association in the set of spatial associations, the UE monitors for a control information carrying the PI of the spatial association on next monitoring occasion.

In one or more of the above-disclosed methods, if the UE receives a signal via a spatial association in the set of spatial associations, the UE does not monitor for a control information carrying the PI of the spatial association in the set of spatial associations excluding the spatial association on next monitoring occasion.

In one or more of the above-disclosed methods, if the UE does not receive a signal via a spatial association in the set of spatial associations, the UE skips monitoring for the control information in the set of control information on next monitoring occasion.

In one or more of the above-disclosed methods, the UE receives a control information carrying the PI of a spatial association, wherein the PI of the spatial association indicates to the UE to drop part of the signal. In one method, the signal carries at least a transport block.

In one or more of the above-disclosed methods, a spatial association in the set of spatial associations is associated with a reference signal.

In one or more of the above-disclosed methods, the UE uses the same spatial parameter/spatial filter/QCL association to receive a signal that is used to receive the reference signal.

In one or more of the above-disclosed methods, the spatial association is a TCI state.

According to one exemplary method, the UE is configured with a table, wherein each entry of the table indicates a combination of a set of spatial associations.

In one method, the UE is configured with the set of spatial associations.

In one method, the size of the table is fixed. Alternately, the size of the table depends on size of the set of spatial associations.

In one or more of the above-disclosed methods, the UE receives a control information, wherein the control information carries at least one PI and a number of bits indicating an entry of the table.

In one or more of the above-disclosed methods, the PI comprises 14 bits.

In one or more of the above-disclosed methods, the UE is configured with size of the control information.

In one or more of the above-disclosed methods, the UE is configured with a RNTI value for monitoring the control information.

In one or more of the above-disclosed methods, the UE is configured with at least a monitoring periodicity for the control information.

In one or more of the above-disclosed methods, the UE monitors for the control information on a configured monitoring occasion if the UE receives a signal before the configured monitoring occasion.

In one or more of the above-disclosed methods, if the UE receives a signal via a spatial association and receives the control information indicating an entry of the table which comprises the spatial association, the UE drops part of the signal based on the PI carried by the control information.

In one or more of the above-disclosed methods, if the UE receives a signal via a spatial association and receives the control information indicating an entry of the table which does not comprise the spatial association, the UE ignores the PI carried by the control information.

In one or more of the above-disclosed methods, if the UE does not receive a signal, the UE skips the monitoring for control information on a configured monitoring occasion.

In one or more of the above-disclosed methods, the signal carries at least a transport block.

In one or more of the above-disclosed methods, a spatial association in the set of spatial associations is associated with a reference signal.

In one or more of the above-disclosed methods, the UE uses the same spatial parameter/spatial filter/QCL association to receive a signal as that signal used to receive the reference signal.

In one or more of the above-disclosed methods, the spatial association is a TCI state.

According to one exemplary method, the UE monitors for the control information carrying a PI in a CORESET if the UE receives a signal before a monitoring occasion.

In one or more of the above-disclosed methods, if the UE does not receive a signal, the UE skips the monitoring for the control information carrying the PI on the monitoring occasion.

In one or more of the above-disclosed methods, the spatial association of the CORESET is the same as the signal.

In one or more of the above-disclosed methods, the spatial association of the CORESET is the same as a first CORESET where a control signal scheduling the signal is transmitted.

In one or more of the above-disclosed methods, if the signal is associated with a spatial association, the UE does not monitor the control information carrying the PI in CORESETs with other spatial associations.

In one or more of the above-disclosed methods, if the signal is scheduled by the control signal transmitted in the first CORESET, the UE does not monitor for the control information carrying the PI other than the first CORESET.

In one or more of the above-disclosed methods, the UE is configured with a mapping.

In one or more of the above-disclosed methods, the mapping indicates a position of the PI for a spatial association.

In one or more of the above-disclosed methods, the mapping indicates the CORESET for receiving the control information carrying the PI of a spatial association, wherein the spatial association is not the same as the CORESET.

In one or more of the above-disclosed methods, the control information comprises at least one PI.

In one or more of the above-disclosed methods, the UE monitors for the control information carrying PI on the CORESET based on the mapping and the spatial association of the signal.

In one or more of the above-disclosed methods, the PI comprises 14 bits.

In one or more of the above-disclosed methods, the UE is configured with a RNTI value for monitoring the control information.

In one or more of the above-disclosed methods, the UE is configured with at least a monitoring periodicity for the control information.

In one or more of the above-disclosed methods, the signal carries at least a transport block.

In one or more of the above-disclosed methods, a spatial association in the set of spatial associations is associated with a reference signal. In one or more of the above-disclosed methods, the spatial association is a TCI state.

Figure 10:
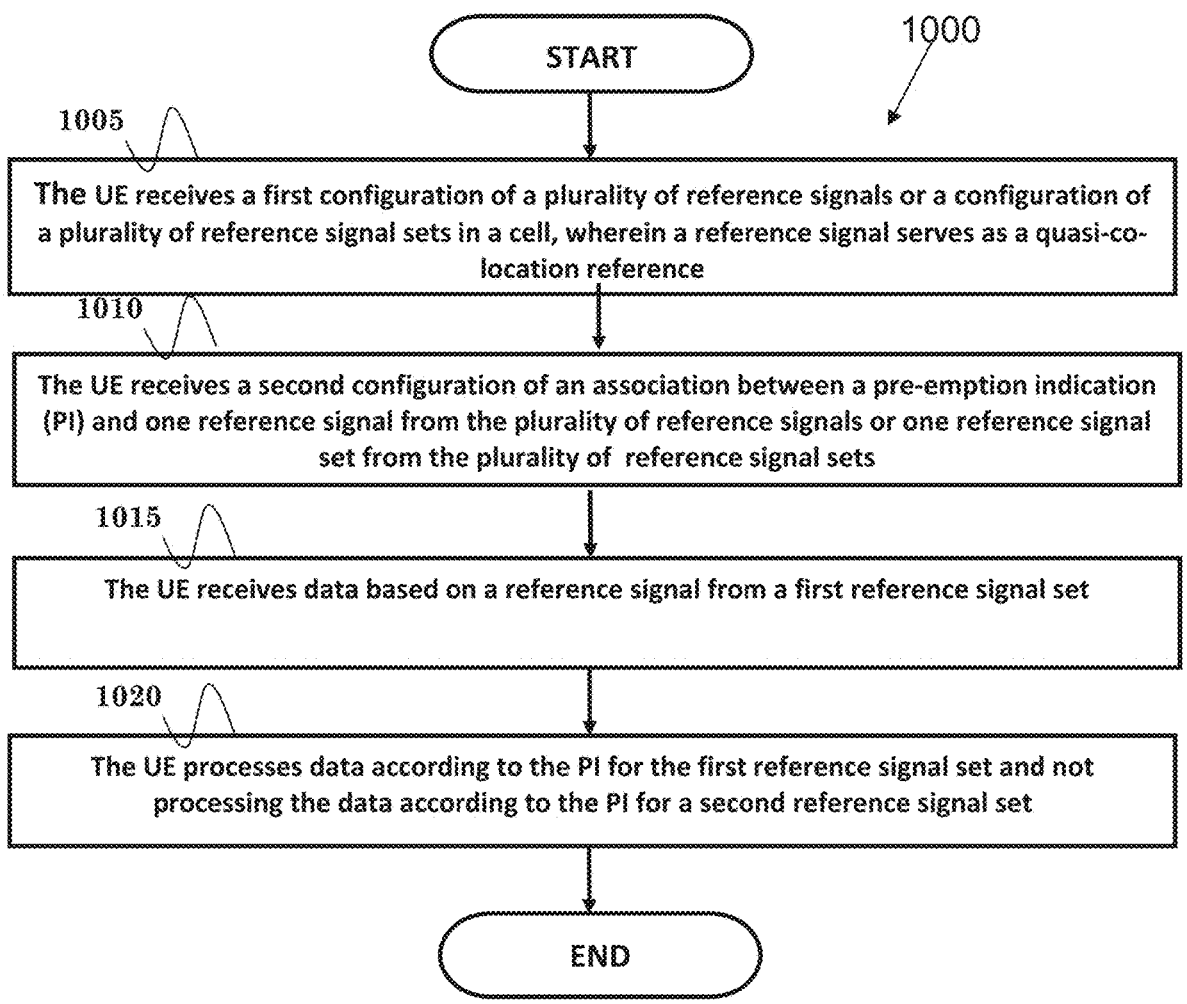
FIG. 10 is a flow diagram for one exemplary embodiment from the perspective of a User Equipment (UE).

FIG. 10 is a flow chart 1000 according to one exemplary embodiment from the perspective of a UE. In step 1005 the UE receives a first configuration of a plurality of reference signals or a configuration of a plurality of reference signal sets in a cell, wherein a reference signal serves as a quasi-co-location reference. In step 1010, UE receives a second configuration of an association between a pre-emption indication (PI) and one reference signal from the plurality of reference signals or one reference signal set from the plurality of reference signal sets. In step 1015, the UE receives data based on a reference signal from a first reference signal set. In step 1020, the UE processes data according to the PI for the first reference signal set and not processing the data according to the PI for a second reference signal set.

In another method, the plurality of reference signal sets comprises at least the first reference signal set and the second reference signal set.

In another method, the reference signal set could be constructed based on the same characteristic, wherein the characteristic is a control resource set, bandwidth part, numerology, subcarrier spacing, Network (NW) beam, Transmission/Reception Point, Radio Network Temporary Identifier, or a same area served by a set of NW beams.

In another method, the reference signal set comprises one or more reference signals.

In another method, the reference signal is used to indicate a reception beam or a transmission beam for a channel or a signal.

In another method, the UE receives a group common Physical Downlink Control Channel (PDCCH) providing a PI for a reference signal or a reference signal set.

In another method, the group common PDCCH provides a PI for its own reference signal or its own reference signal set, wherein its own reference signal or its own reference signal set is used by the UE to receive the group common PDCCH.

In another method, the group common PDCCH provides a PI for all reference signal sets.

In another method, the association between a PI and a reference signal or between a PI and a reference signal set is an association between a PI position in the group common PDCCH and a reference signal or a reference signal set.

In another method, the PI position is an integer multiple of 14.

In another method, the PI position is a starting position of a PI in a downlink control information.

In another method, the UE is configured with a table, wherein each entry of the table indicates a reference signal or a reference signal set.

In another method, the group common PDCCH indicates an entry of the table for indicating an association between a PI and a reference signal or reference signal set.

As those skilled in the art will appreciate, the various disclosed embodiments may be combined to form new embodiments and/or methods.

Referring back to FIGS. 3 and 4, in one embodiment, the device 300 includes a program code 312 stored in memory 310. The CPU 308 could execute program code 312 (i) to receive a first configuration of a plurality of reference signals or a configuration of a plurality of reference signal sets in a cell, wherein a reference signal serves as a quasi-co-location reference, (ii) to receive a second configuration of an association between a pre-emption indication (PI) and one reference signal from the plurality of reference signals or one reference signal set from the plurality of reference signal sets, (iii) to receive data based on a reference signal from a first reference signal set; and (iv) to process data according to the PI for the first reference signal set and not processing the data according to the PI for a second reference signal set.

Furthermore, the CPU 308 can execute the program code 312 to perform all of the above-described actions and steps or others methods described herein.

The above-disclosed methods provide a downlink transmission reception by a different beam in the same group could be reserved not to drop, which could improve resource efficiency.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:
   receiving a first configuration of a plurality of reference signals or a configuration of a plurality of reference signal sets in a cell, wherein a reference signal serves as a quasi-collocation reference and the plurality of reference signal set comprises at least a first reference signal set and a second reference signal set;
   receiving a second configuration of an association between a pre-emption indication (PI) and one reference signal from the plurality of reference signals or one reference signal from the plurality of reference signal sets;
   receiving data based on a reference signal;
   receiving one or more PIs, wherein each of the one or more PIs is derived, based on the association, for one of the plurality of the reference signal sets; and
   processing data according to the PI for the first reference signal set and not processing the data according to the PI for the second reference signal set, wherein the reference signal for receiving data is included in the first reference signal set, and not included in the second reference signal set.

2. The method of claim 1, wherein the reference signal set is constructed based on the same characteristic, wherein the characteristic is a control resource set, bandwidth part, numerology, subcarrier spacing, Network (NW) beam, Transmission/Reception Point (TRP), Radio Network Temporary Identifier (RNTI), or a same area served by a set of NW beams.

3. The method of claim 1, wherein the reference signal set comprises one or more reference signals.

4. The method of claim 1, the reference signal is used to indicate a reception beam or a transmission beam for a channel or a signal.

5. The method of claim 1, further comprising:
   receiving a group common Physical Downlink Control Channel (PDCCH) providing the PI for the reference signal or the reference signal set.

6. The method of claim 5, wherein the group common PDCCH provides the PI for its own reference signal or its own reference signal set, wherein its own reference signal or its own reference signal set is used to receive the group common PDCCH.

7. The method of claim 5, wherein the group common PDCCH provides the PI for the plurality of reference signal sets.

8. The method of claim 5, wherein the association between the PI and the reference signal or between the PI and the reference signal set is an association between a PI position in the group common PDCCH and the reference signal or the reference signal set.

9. The method of claim 8, wherein the PI position is an integer multiple of 14.

10. The method of claim 8, wherein the PI position is a starting position of the PI in a downlink control information.

11. The method of claim 5, wherein the group common PDCCH indicates an entry of a table for indicating the association between the PI and the reference signal or the reference signal set.

12. The method of claim 11, wherein the UE is configured with the table and the entry of the table indicates the reference signal or the reference signal set.

13. The method of claim 1, wherein the first reference signal set is different from the second reference signal set.

14. A User Equipment (UE), comprising:
    a control circuit;
    a processor installed in the control circuit; and
    a memory installed in the control circuit and coupled to the processor;
    wherein the processor is configured to execute a program code stored in the memory to:
      configure the UE with a plurality of reference signals or a plurality of reference signal sets in a cell, wherein a reference signal serves as a quasi-collocation reference and the plurality of reference signal set comprises at least a first reference signal set and a second reference signal set;
      configure the UE with an association between a pre-emption indication (PI) and one reference signal from the plurality of reference signals or one reference signal set from the plurality of reference signal sets;
      receive data based on a reference signal;
      receive one or more PIs, wherein each of the one or more PIs is derived, based on the association, for one of the plurality of the reference signal sets; and
      process data according to the PI for the first reference signal set and not process the data according to the PI for the second reference signal set, wherein the reference signal for receiving data is included in the first reference signal set, and not included in the second reference signal set.

15. The method of claim 1, wherein the PI for the first reference signal set is received based on one reference signal included in the first reference signal set; and/or wherein the PI for the second reference signal set is received based on one reference signal included in the second reference signal set.

16. The method of claim 1, wherein processing data according to a specific PI means decoding the data via considering one portion of the data, indicated by the specific PI is pre-empted or has no transmission for the UE.

17. The method of claim 1, wherein not processing data according to a specific PI means decoding the data without considering pre-empted indication by the specific PI.

\* \* \* \* \*